P. WINAND.
INTERNAL COMBUSTION ENGINE APPLICABLE TO SUBMARINE BOATS.
APPLICATION FILED SEPT. 8, 1908.

1,003,565.

Patented Sept. 19, 1911.

2 SHEETS—SHEET 1.

Witnesses.
Inventor:
Paul Winand,

P. WINAND.
INTERNAL COMBUSTION ENGINE APPLICABLE TO SUBMARINE BOATS.
APPLICATION FILED SEPT. 8, 1908.

1,003,565.

Patented Sept. 19, 1911.

2 SHEETS—SHEET 2.

Section I.

Section II-II.

UNITED STATES PATENT OFFICE.

PAUL WINAND, OF COLOGNE, GERMANY.

INTERNAL-COMBUSTION ENGINE APPLICABLE TO SUBMARINE BOATS.

1,003,565.  Specification of Letters Patent.  Patented Sept. 19, 1911.

Application filed September 8, 1908. Serial No. 452,140.

*To all whom it may concern:*

Be it known that I, PAUL WINAND, engineer, a subject of the King of Belgium, residing at 1 Sudermannstrasse, Cologne-on-the-Rhine, Germany, have invented certain new and useful Improvements in and Relating to Internal-Combustion Engines Applicable to Submarine Boats; and I do hereby declare the following to be a full, clear, and exact description of the invention, such as will enable others skilled in the art to which it appertains to make and use the same.

My invention relates to improvements in internal combustion engines for submarine boats, and more particularly to that class of engines which are adapted for operation with atmospheric air or with an artificial oxygen carrier.

One of the objects of the improvements is to so arrange the engine within the boat, that it fits closely the shell so as to occupy as little space as possible.

A further object of the improvements is to so construct the engine and its subsidiary apparatus, that, under normal conditions, it runs with the most favorable consumption of fuel, while the consumption of fuel and oxygen is held within moderate limits, if greater power is required.

My invention also consists in certain details of construction, such as will hereinafter be explained and specifically pointed out in the appended claims.

For the purpose of explaining the invention, I have shown an example embodying the same in the accompanying drawing, in which the same letters of reference have been used in all the views to indicate corresponding parts.

Figure 1:
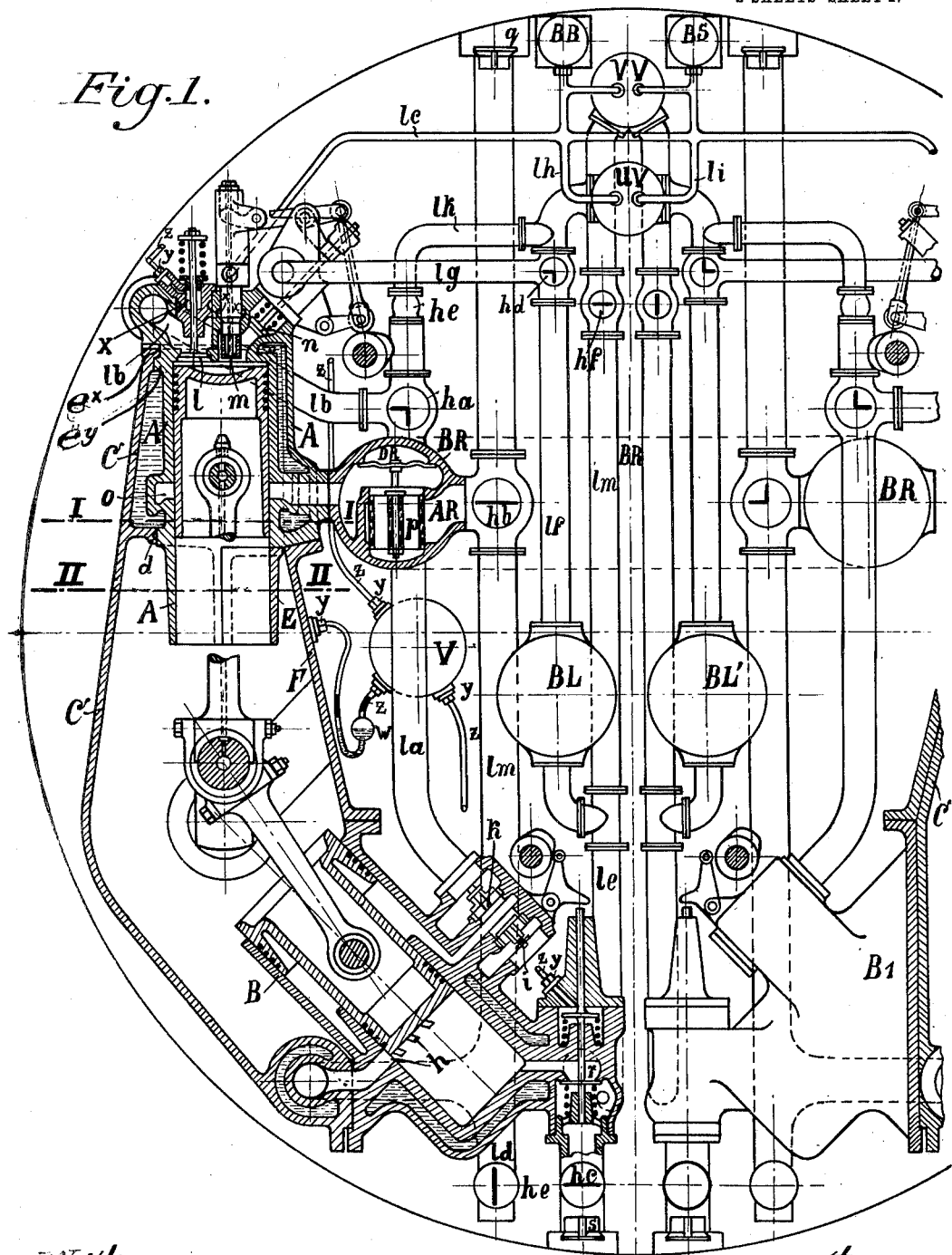
Figure 2:
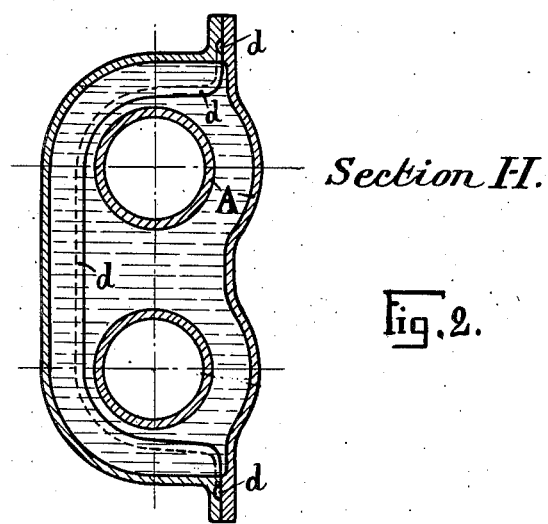
Figure 3:
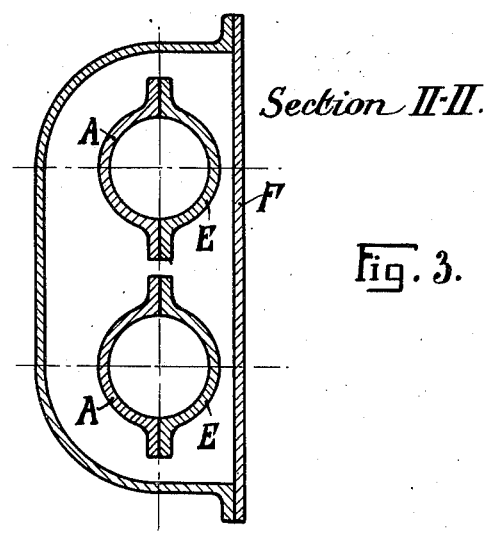

In said drawings Figure 1 is a vertical cross section of a submarine boat having a combustion engine installation in accordance with the invention, with certain parts omitted. Fig. 2 is a horizontal longitudinal section on line I—I of Fig. 1. Fig. 3 is a like section on line II—II of Fig. 1.

In order that the engine may fit the circular cross-section of the boat, symmetrically arranged motor cylinders A (one of which is not shown in the drawing) are connected with the inclined pumps B B¹ respectively, situated below the crank shaft. The cylinders may be carried by the frame, one on each side of the middle line of the boat. For this purpose each cylinder may conveniently be cast in one piece with that portion of its water jacket which is nearer the middle of the boat, the other portion of the jacket being formed by the frame C to which the cylinder is screwed, a watertight joint being formed by the washers $d\ d$. Only one half of the cylinder is continued below the lower of these washers the remainder being a separate piece E held in place by screws in order that it may be readily removed to afford access to the piston and connecting rod. In this manner, the engine frame forms the larger part of the water jacket; and the working cylinder, which carries the smaller part of said jacket, is so arranged with respect to said frame that the water jacket is divided along a plane parallel to the axis of the cylinder. The assemblage of the two parts of the water jacket and the mounting of the cylinder in the frame takes place from the side, that is, the cylinder is introduced into the frame transversely, and in a direction at right angles to the cylinder axis. The frame is provided at the top with a flange $e^x$ under which engages a flange $e^y$ on the cylinder at a point beneath the laterally enlarged integral head of the latter, and in this manner the pressure on the cylinder head exerted by the explosive gases is resisted and taken up by the flange $e^x$ on the frame instead of by the ordinary screws or bolts.

Although the motor cylinder is here shown above the pump cylinder, the arrangement may be reversed, the pump cylinders being above the motor cylinders; or the one arrangement may obtain on one side of the boat and the other on the other side. It is not essential that the motor cylinders should be strictly vertical; they may be slightly inclined. The arrangement shown is, however, preferable.

Each pump B is constructed with a double piston so as to form two separate pumps, the chamber of the upper one being annular, while that of the lower is cylindrical.

The lower pump serves several functions. (*a*) When the motor is to be started the lower pump is operated as a compressed air motor being fed from the compressed air reservoir. (*b*) When the motor is in normal operation above the surface of the water the lower pump supplies the compressed air reservoir which at other times supplies the air for starting the motor and for increasing its output. (c) When the motor is operating under water the lower pump in one or more of the pumps fulfils one function while that in the other pump or pumps fulfils another function. A certain number of the lower pumps may serve for the uninterrupted discharge of the exhaust from the working cylinders into the surrounding water; other of the lower pumps may be driven with hot gases under pressure for increasing the output of the corresponding motors.

The annular upper pump serves in normal operation above the surface of the water for taking in the scavenging air from the atmosphere and blowing it through the motor cylinder. When the boat is operating under water the annular space or chamber of the pump serves in the same manner to scavenge the motor cylinder by blowing through the same the so-called artificial air referred to in the next paragraph.

The motor operates on a two-stroke cycle on the principle of the Diesel engine, and when the boat is submerged is fed with a gas containing oxygen instead of with atmospheric air, the said gas being advantageously produced by the incomplete combustion of an oxygenated body with petroleum or some other suitable combustible; such a gas will be termed hereinafter "artificial air." As the piston performs its working stroke the slots $o$ are uncovered for the discharge of the products of combustion and the valve $l$ is opened for admission of scavengering air. During the return stroke the air is compressed and at the dead point combustible and air for distributing it are injected through nozzle $m$. When the load on the motor is increased compressed air is injected through a separate valve $n$ immediately after opening the valve for the combustible, and an increased amount of the latter is thus injected corresponding with this additional compressed air. In this manner an increase is obtained in the working diagram which considerably exceeds the work expended in pumping the air injected.

As shown in Fig. 1, the nozzle $m$ is surrounded by a jacket which forms a chamber discharging directly into the cylinder around said nozzle, and the valve $n$ discharges into the cylinder by way of this chamber.

In addition to the apparatus and reservoirs necessary for this mode of working, namely the compressed air reservoirs BL, BL', the fuel reservoir BB, the reservoir for the artificial oxygen carrier BS, and the combustion chamber UV for the incomplete combustion necessary for producing the "artificial air," there is a second combustion chamber VV for complete combustion and a pair of exhaust product reservoirs BR. The combustion chamber VV is for the purpose of producing from the fuel and the artificial oxygen carrier hot combustion gases under pressure when, the boat being submerged, it is desired to increase the output; these gases are expanded in the lower pump chamber in order to aid the corresponding motor.

The exhaust reservoir BR is for maintaining the counter-pressure of the exhaust uniform whatever the depth of submersion. The load on the check valve through which the exhaust is expelled into the water varies with the depth and if no arrangement were made for removing this varying pressure from the exhaust openings in the motor cylinder, irregularity of working owing to variation of depth, would ensue. Each reservoir BR is therefore provided with a valve $p$ for maintaining constant pressure; this valve cuts off the reservoir from the chamber AR wherefrom the pump removes the exhaust, and is under the influence of a diaphragm exposed on one side to the pressure in the exhaust reservoir and on the other side to the pressure in a chamber DR wherein the pressure remains constant. Whenever, therefore, the pressure in the exhaust reservoir exceeds that in the chamber DR, the valve $p$ is opened and remains open while this difference of pressure is maintained; thus the pressure in the reservoir remains constant.

The connection of the reservoirs and chambers with each other, as well as with the parts of the motors and pumps, are apparent from the drawing, and the different modes of operating the motor will now be explained.

1. *Working under normal load when afloat.*—The upper part of the pump takes in air through valve $i$ and forces it through valve $k$, duct $l\ a$, cock $h\ a$, duct $l\ b$ and valve $l$ into the motor cylinder, where it performs the duty of scavengering air. The fuel is supplied from reservoir BB through duct $l\ c$; the exhaust passes through slots $o$, valve $p$, cock $h\ b$ and valve $q$ into the atmosphere. At the same time the lower part of the pump draws in air through cock $h\ e$, duct $l\ d$ and slots $h$ and forces it through valve $r$ and duct $l\ e$ into the air reservoir BL for subsequent use in starting the motor and for distributing the fuel.

2. *Working under increased load when afloat.*—The motor and pump work as already described, but immediately after the fuel nozzle has opened, compressed air enters the cylinder from the reservoir BL through duct $l\ f$, cock $h\ d$ and duct $l\ g$. In this mode of working the cocks have the position indicated in the left hand half of Fig. 1.

3. *Working under normal load when submerged.*—In the combustion chamber UV, which receives fuel from reservoir BB through $l\ h$ and oxygen carrier from reservoir BS through duct $l\ i$, "artificial air" under pressure is produced by incomplete combustion; this material passes through duct $l\ k$, reducing valve $h\ e$, cock $h\ a$ and duct $l\ b$ to the scavengering valve $l$ of the motor. As in the previous cases, fuel is introduced through nozzle $m$ while the exhaust escapes through slots $o$ into the reservoir BR whence it passes through valve $p$ into the chamber AR to be sucked into the lower part of the pump through cock $h\ b$, duct $l\ m$ and slots $h$, to be discharged through the valve $r$, cock $h\ c$ and check valve $s$.

4. *Working under increased load when submerged.*—Motor and pump work as previously described, but directly after the fuel admission valve has been opened, "artificial air" under pressure is introduced through valve $n$ from the chamber UV, passing through cock $h\ d$ and duct $l\ g$.

5. *Working under still higher load when submerged — highest output.*—Motor and pump work as previously described, but only some of the pumps are necessary for removing the exhaust from all the motors, so that other of the pumps are free to be driven as compressed air motors by means of hot products of combustion under pressure and thus to aid the motors. For this purpose fuel from reservoir BB and oxygen carrier from reservoir BS are burned completely in chamber VV and the products pass through cock $h\ f$, duct $l\ m$ and valve $r$ into the lower part of the pump where they expand and after doing work on the piston escape through slots $h$, duct $l\ d$, cock $h\ b$ and valve $q$. The cocks have the positions indicated in the right hand half of Fig. 1.

It is of the utmost importance that the engine room in a submarine boat should be kept free from poisonous or otherwise dangerous gases and vapors. With this object in view the engine framing is constructed as a completely closed casing, and through a union $y$ and a pipe $z$ the casing is in communication with a container V wherein the pressure is maintained at such a point that the pressure within the casing is always below that in the engine room. In order also to prevent escape of gases or vapors at the valve seatings, stuffing boxes, pipe joints and the like, each of these is provided with a double joint, the space between the joints being likewise in communication with the said low pressure chamber or with a separate exhausting device. In Fig. 1, for instance, both the scavenging valve $l$ and the fuel valve $m$ are surrounded by annular spaces $x$, $y$ each of them being connected by a union and a pipe $z$ with the lower pressure chamber. In order to check leakages each pipe $z$ or some of them may be provided with a device for observing the quantity of gas or vapor passing to the low pressure chamber; in Fig. 1 a glass tube $w$ containing liquid serves this purpose, for the amount of leakage can be estimated by observing the rate at which bubbles pass through the liquid.

Having now particularly described and ascertained the nature of my said invention and in what manner the same is to be performed, I declare that what I claim is:

1. In an internal combustion engine, the combination with an engine frame constituting one part of the water jacket, of a working cylinder formed integral within the other part or section of the water jacket, said jacket being divided along a plane parallel to the axis of the cylinder, and said cylinder with its water jacket section being movable laterally with respect to the frame, and transversely to the cylinder axis, into the assembled position.

2. In an internal combustion engine, the combination with an engine frame having a laterally extending flange, of a working cylinder movable laterally with respect to said frame, and transversely of the cylinder axis, into its assembled position in said frame, and a lateral flange on said cylinder extending under the flange on the frame, whereby the pressure of the gases on the cylinder head is resisted by the engine frame flange.

3. In an internal combustion engine, the combination with an engine frame having a laterally extending flange at its upper portion, of a working cylinder having a flange at its upper portion lying under and against the aforesaid flange, the head of said cylinder being enlarged laterally and overlying the top of the engine frame, and the cylinder being movable laterally into its assembled position in said frame.

4. In an internal combustion engine, the combination with an engine frame that constitutes a part or section of the water jacket, of a working cylinder having the other part of the water jacket formed integral therewith, the water jacket as a whole being divided along a plane parallel to the cylinder axis, a laterally extending flange on the engine frame, and a laterally extending flange on the cylinder taking under said first named flange.

5. In an internal combustion engine, the combination with a fuel nozzle adapted to inject a combustible charge of air and fuel into the cylinder, of a jacket surrounding said nozzle and forming a chamber discharging into the cylinder, means to force additional air under pressure through said chamber and into the cylinder.

6. An internal combustion engine having a vertical working cylinder extending with its lower part beyond the frame supporting the same, said lower part comprising a section made integral with the cylinder and a removable section.

7. The combination of an internal combustion engine, a pump cylinder, a piston for said pump cylinder, pipe connections between one side of said pump cylinder and the cylinder of the engine and adapted to supply scavengering air to the engine cylinder, a reservoir connecting with the other side of said cylinder, and valves and means to connect said reservoir with its cylinder side in such a way, that gas is either forced from the cylinder into the reservoir and accumulated therein, or from the reservoir into the cylinder so as to operate the same as a motor.

8. The combination of an internal combustion engine, a pump having two working chambers, a compressed air reservoir connected with one chamber of the pump for starting purposes and supplied with air from the latter in normally running, and connections between the other pump chamber and the engine cylinder to supply the latter with scavenging air.

9. The combination of an internal combustion engine, a pump cylinder, a piston for said pump cylinder, pipe connections between one side of said pump cylinder and the cylinder of the engine and adapted to supply scavengering air to the engine cylinder, a reservoir connecting with the other side of said cylinder, means to supply burned gas under pressure to the last named cylinder side, and means to connect, with its cylinder side, either said reservoir in such a way as to force gas from the cylinder into the reservoir and to accumulate the same therein, or said means for supplying burned gas under pressure, or said reservoir, in such a way as to force gas into the cylinder so as to operate the same as a motor.

10. The combination of an internal combustion engine, a pump connected thereto and having two chambers, a source of hot gases under pressure, means to connect said source with one of the pump chambers, and connections between the other pump chamber and the engine cylinder for supplying the latter with scavenging air.

11. In an internal combustion engine, the combination with the engine proper, of a frame formed as a receptacle inclosing the engine, and means to reduce the pressure within said receptacle below that of the surrounding atmosphere.

12. In an internal combustion engine, the combination with the cylinder and a valve and its stem, of a guide for said stem consisting of two sections forming an annular chamber surrounding the stem, and means to keep said chamber under diminished pressure.

13. In an internal combustion engine, the combination with the cylinder and a valve and its stem, of a guide for said stem consisting of two sections forming an annular chamber surrounding the stem, means to withdraw the gas escaping from the cylinder into said chamber, and means to indicate the amount of gas thus withdrawn.

In testimony whereof I have affixed my signature, in presence of two witnesses.

PAUL WINAND.

Witnesses:
  M. KUPPERS,
  BESSIE F. DUNLAP.